(12) United States Patent
Masumiya et al.

(10) Patent No.: US 10,324,443 B2
(45) Date of Patent: Jun. 18, 2019

(54) TOOL PATH GENERATING METHOD AND TOOL PATH GENERATING APPARATUS

(71) Applicant: MAKINO MILLING MACHINE CO., LTD., Tokyo (JP)

(72) Inventors: Yasunori Masumiya, Kanagawa (JP); Kyohei Suzuki, Kanagawa (JP); Hiroki Kato, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 15/555,136

(22) PCT Filed: Mar. 13, 2015

(86) PCT No.: PCT/JP2015/057590
§ 371 (c)(1),
(2) Date: Sep. 1, 2017

(87) PCT Pub. No.: WO2016/147274
PCT Pub. Date: Sep. 22, 2016

(65) Prior Publication Data
US 2018/0046165 A1 Feb. 15, 2018

(51) Int. Cl.
*B23C 3/08* (2006.01)
*B23C 3/12* (2006.01)
*G05B 19/19* (2006.01)
*G05B 19/4093* (2006.01)

(52) U.S. Cl.
CPC ............... *G05B 19/19* (2013.01); *B23C 3/08* (2013.01); *B23C 3/12* (2013.01); *G05B 19/4093* (2013.01); *B23C 2220/16* (2013.01); *G05B 2219/34088* (2013.01)

(58) Field of Classification Search
CPC ......... B23C 2220/16; B23C 3/08; B23C 3/12; G05B 19/19; G05B 19/4093; G05B 2219/34088
See application file for complete search history.

(56) References Cited

U.S. PATENT DOCUMENTS

2005/0010327 A1    1/2005   Nakamura
2015/0220079 A1*   8/2015   Mitani ............. G05B 19/40937
                                                                   700/160

FOREIGN PATENT DOCUMENTS

JP    1-32010     6/1989
JP    7-24692     1/1995
JP    10-58363    3/1998
(Continued)

OTHER PUBLICATIONS

International Search Report dated Jun. 9, 2015, directed to PCT/JP2015/057590; 2 pages.

*Primary Examiner* — Yuhui R Pan
(74) *Attorney, Agent, or Firm* — Morrison & Foerster LLP (57) ABSTRACT

This tool path generating method, which generates a tool path for machining a corner section at which a recess section machined in a workpiece intersects with the outer circumferential surface of the workpiece, includes: a step for calculating a virtual traveling direction, which is a movement direction of a point on the rotational axis line of a rotating tool when the recess section is machined; a step for calculating the position of the corner section from the virtual traveling direction and shape data of the workpiece; and a step for generating a tool path for machining along the calculated position of the corner section.

5 Claims, 11 Drawing Sheets

(56) References Cited

FOREIGN PATENT DOCUMENTS

| JP | 2005-271148 | 10/2005 |
|----|-------------|---------|
| JP | 2007-15084 | 1/2007 |
| JP | 2010-277585 | 12/2010 |
| JP | 2011-85978 | 4/2011 |
| JP | 5289644 | 9/2013 |
| WO | 2006/031945 | 3/2006 |
| WO | WO-2011/004584 | 1/2011 |

* cited by examiner

TOOL PATH GENERATING METHOD AND TOOL PATH GENERATING APPARATUS

CROSS-REFERENCE TO RELATED APPLICATION

This application is a U.S. National Stage Application of International Patent Application No. PCT/JP2015/057590, filed on Mar. 13, 2015, which is hereby incorporated by reference in the present disclosure in its entirety.

FIELD OF THE INVENTION

The present invention relates to a tool path generating method and a tool path generating apparatus, more particularly relates to a tool path generating method and a tool path generating apparatus chamfering an opening edge of a recess of a groove extending along a three-dimensional curve and changing in its opening direction at each position.

BACKGROUND OF THE INVENTION

Conventionally, when chamfering a corner part where an outer circumferential surface of a three-dimensional cam such as a cylindrical cam intersects the side surface of a cam groove formed there, a method of simultaneously forming the chamfered part at the left and right sides of the cam groove and a method of forming it one side at a time are known. As the former method, there are known a method of simultaneously forming a cam groove and chamfered part using a dedicated tool having a blade part having an outer shape equal to the width of the cam groove and a chamfering blade part expanding conically from the blade part and, for example, as disclosed in PLT 1, a method of forming the cam groove, then chamfering it using a dedicated tool having a chamfering blade part expanding conically from the width of the cam groove. As a method of forming one side at a time, for example, the method described in PLT 2 is known. There, the groove is formed, and then is chamfered using a conical tool having an outside diameter smaller than the groove.

A cam groove may also be chamfered not by using a machine tool, but manually using a file. According to this, there is no need to prepare a dedicated tool or an NC program for chamfering.

PATENT LITERATURE

PLT 1: Japanese Patent Publication No. 1-32010B2
PLT 2: Japanese Patent No. 5289644

BRIEF SUMMARY OF THE INVENTION

There is a problem that if manually forming a chamfered part at an opening edge of a cam groove by using a file, the dimensional accuracy of the chamfered part cannot be increased. However, even in the case of forming it using a machine tool, the problem arises that the dimensions of the chamfered part will vary depending on the location in the recessed part of a cam groove of a three-dimensional cam.

Figure 12:
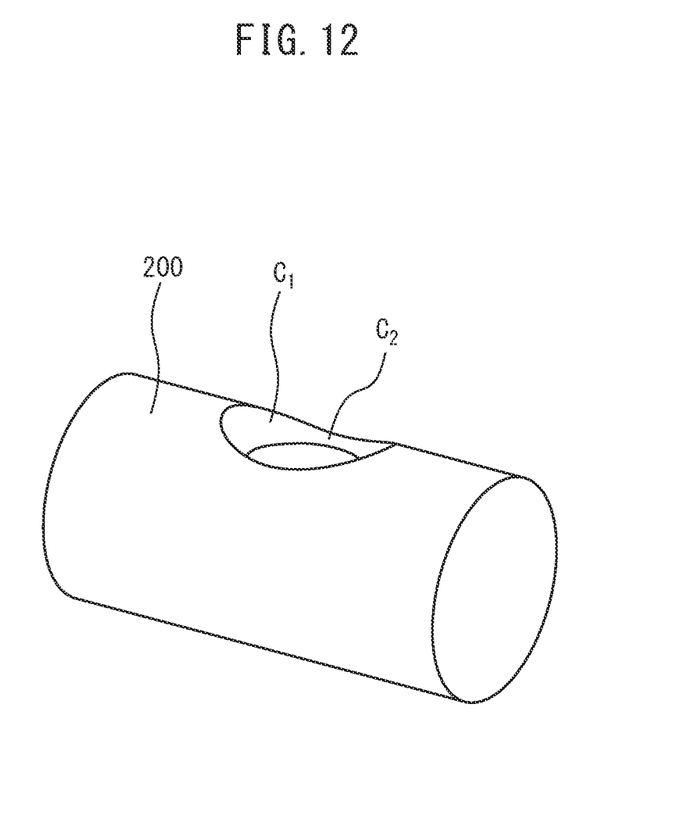
FIG. 12 is a perspective view of a cylinder having a circular hole formed with a non-uniform chamfered part according to the prior art.

For example, when machining a corner part extending as a three-dimensional curve as a cam groove of a cylindrical cam, that is, an opening edge of a cam groove, using a machine tool by a tool having a conical chamfering blade part such as shown in PLT 1, the dimensions of the chamfered part obtained by the machining process will vary depending on the location of the cam groove. This is not a problem of machining accuracy, but principle. If a cam groove extends at a constant pitch angle (angle formed by the longitudinal axis of cylinder of cam and its curve) like a screw groove, the dimensions of the chamfered part formed in the cam groove will become uniform except at the end parts of the cam groove. However, an actual cam groove is often formed based on a spiral curve in which the pitch angle changes. The dimensions of the chamfered part of the cam groove in that case will vary according to the change in the pitch angle. This may be able to be deduced from that fact that in FIG. 12 showing a case where a simple circular hole is formed in the surface of the cylinder 200 instead of a groove and where a chamfered part is formed at this by using a conical tool (not shown), a relatively large $C_1$ part and a relatively small $C_2$ part are formed at the chamfered part. Note that in the past, despite using a machine tool to work the part, the maximum value of the dimensions of a chamfered part of a cam groove of an actual cylindrical cam often exceeded two times the minimum value.

In this way, the uneven dimensions of the chamfered part of a cam groove have become one of the factors hindering reduction of size of devices, particularly in the case of small sized precision instruments and the like. Further, for cam manufacturers manufacturing cams and supplying them to other equipment manufacturers, it will be understood that uneven dimension chamfered parts lowered the product value of cams even if there are no problems in performance.

Further, if generating a tool path for chamfering in order to chamfer a part by a machine tool, it is not easy to automatically specify which position is a corner part where chamfering is required. Even if it is possible to specify the position of the corner part to be chamfered, it is not easy to find out which tool path offset in which direction of the corner part the tool for chamfering should be moved by.

The present invention is made in view of the above circumstances and has as its object to provide a tool path generating method and a tool path generating apparatus that enable an opening edge of a recess of a groove extending along a three-dimensional curve and varying in its opening direction at different positions to be chamfered by uniform dimensions.

In order to achieve the above object, according to the present invention, there is provided a tool path generating method for generating a tool path for machining a corner part where a recessed part formed in a workpiece and an outer circumferential surface of the workpiece intersect, which tool path generating method comprising a step of calculating, as a virtual traveling direction, a direction of movement of a point on a rotational axis of a rotary tool when machining that recessed part, a step of calculating a position of the corner part from the virtual traveling direction and shape data of the workpiece, and a step of generating a tool path for machining the workpiece along the calculated position of the corner part.

In the present invention, in the step of generating a tool path for machining the workpiece along the position of the corner part, it is possible to find a path offset from the corner part from the calculated virtual traveling direction and the position of the corner part and make the offset path the tool path machining the corner part.

In the present invention, the tool path for machining the workpiece along the position of the corner part may be a path of a tool for straight or curved chamfering of the corner part.

In the present invention, the workpiece may be a cylindrical cam, a conical cam, and a roller gear cam, the recessed part may be a cam groove, and the tool path of the rotary tool may be the locus of a center axis of a cam follower engaging with the cam groove.

Further, according to the present invention, there is provided a tool path generating apparatus for generating a tool path for machining a corner part where a recessed part formed in a workpiece and an outer circumferential surface of the workpiece intersect, comprising a shape data reading unit for reading a tool path of a rotary tool when machining the recessed part and shape data of the workpiece and a path setting unit for finding a position of the corner part from a tool path of the rotary tool when machining the recessed part and shape data of the workpiece and generating a tool path for machining the workpiece along the position of the corner part found.

According to the tool path generating method of the present invention, the position of a corner part to be chamfered can be accurately found based on the path of the center of the rotary tool for grooving use used for forming a groove, so it is possible to form a uniform chamfered part even when a groove extends along a three-dimensional curve while changing in its opening direction.

DETAILED DESCRIPTION OF THE INVENTION

Hereinafter, a tool path generating method according to an embodiment of the present invention will be described with reference to the accompanying drawings. The present invention can be worked utilizing various machine tools, but in the description of this embodiment, a four-axis control horizontal machining center in which a spindle extends in the horizontal direction is used. In the description of this embodiment, a workpiece being machined is a cylindrical shape to be processed into a cylindrical cam. In the present embodiment, a cam groove is already formed in the workpiece, and opening edges of the cam groove are chamfered. The tool path for chamfering can be obtained if the tool path for machining the cam groove is known, so it is also possible to find the tool path for chamfering before machining the cam groove and perform the chamfering after machining the cam groove by the same setup.

Figure 1:
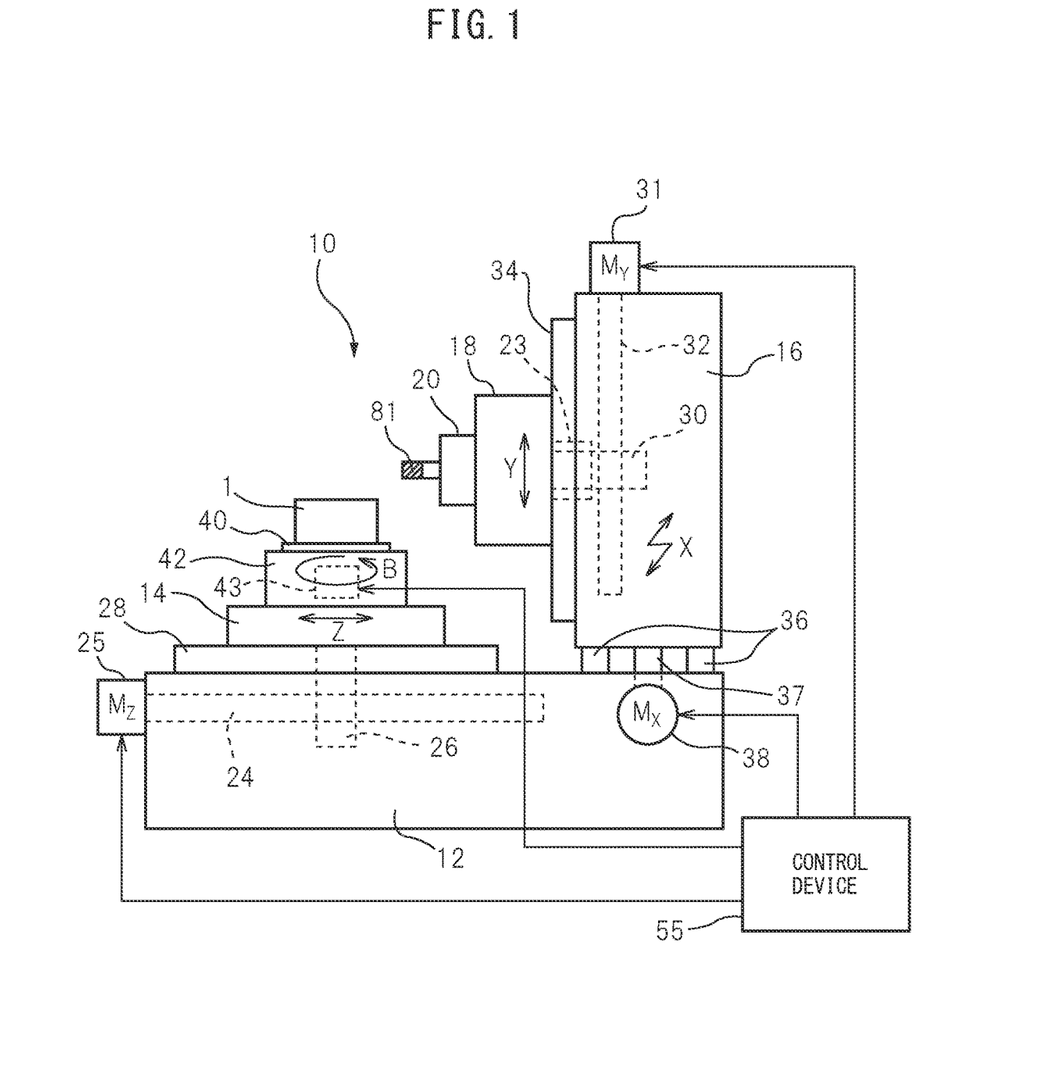
FIG. 1 is a schematic side view of a machine tool used in a tool path generating method according to an embodiment of the present invention.

A machine tool 10 shown in FIG. 1, a horizontal machining center, comprises a bed 12 installed on a floor of a factory or the like, a Z-axis guide rail 28 fixed on the bed 12, a table 14 disposed on the Z-axis guide rail 28 to be able to slide in the Z-axis direction, a rotary table 42 disposed on an upper surface of the table 14 and able to rotate in the B-axis direction, and a holding member 40 for the workpiece fixed to the upper surface of the rotary table 42. The machine tool 10 includes X-axis guide rails 36 fixed on the bed 12, a column 16 disposed on the X-axis guide rails 36 to be able to slide in the X-axis direction, a Y-axis guide rail 34 fixed to a side surface of the column 16 at the left side in FIG. 1, a spindle head 18 disposed on the Y-axis guide rail 34 to be able to slide in the Y-axis direction, a spindle 20 rotatably supported by the spindle head 18, and a grooving tool 81 as a rotary tool fixed to the spindle 20.

The machine tool 10 has the three axes of the X-axis, Y-axis, and Z-axis as linear feed axes orthogonal to each other and a B-axis as a rotary feed axis around the Y-axis. The machine tool 10 is comprised of a moving device for each axis, that is, an X-axis moving device, a Y-axis moving device, a Z-axis moving device, and a B-axis moving device, and a control device 55 for controlling these moving devices.

The Z-axis moving device comprises a Z-axis feed screw 24 disposed inside the bed 12, a nut 26 engaged with the Z-axis feed screw 24 and also connected to the table 14, and a Z-axis servo motor 25 connected to one end of the Z-axis feed screw. The table 14 is configured to move along the Z-axis guide rail 28 by rotational drive of the Z-axis servo motor 25.

The X-axis moving device comprises an X-axis feed screw disposed inside the bed 12, a nut 37 engaged with the X-axis feed screw and connected to the column 16, and an X-axis servo motor 38 connected to one end of the X-axis feed screw. The column 16 is configured to move along the X-axis guide rails 36 by rotational drive of the X-axis servo motor 38.

The Y-axis moving device includes a Y-axis feed screw 32 disposed inside the column 16, a nut 30 engaged with the Y-axis feed screw 32 and connected to the spindle head 18, and a Y-axis servo motor 31 connected to the upper end of the Y-axis feed screw 32. The spindle head 18 is configured to move along the Y-axis guide rail 34 by rotational drive of the Y-axis servo motor 31.

The B-axis moving device comprises a B-axis servo motor 43 for making the workpiece 1 rotate. By the B-axis servo motor 43 being driven, the workpiece 1 rotates in the B-axis direction.

Figure 2:
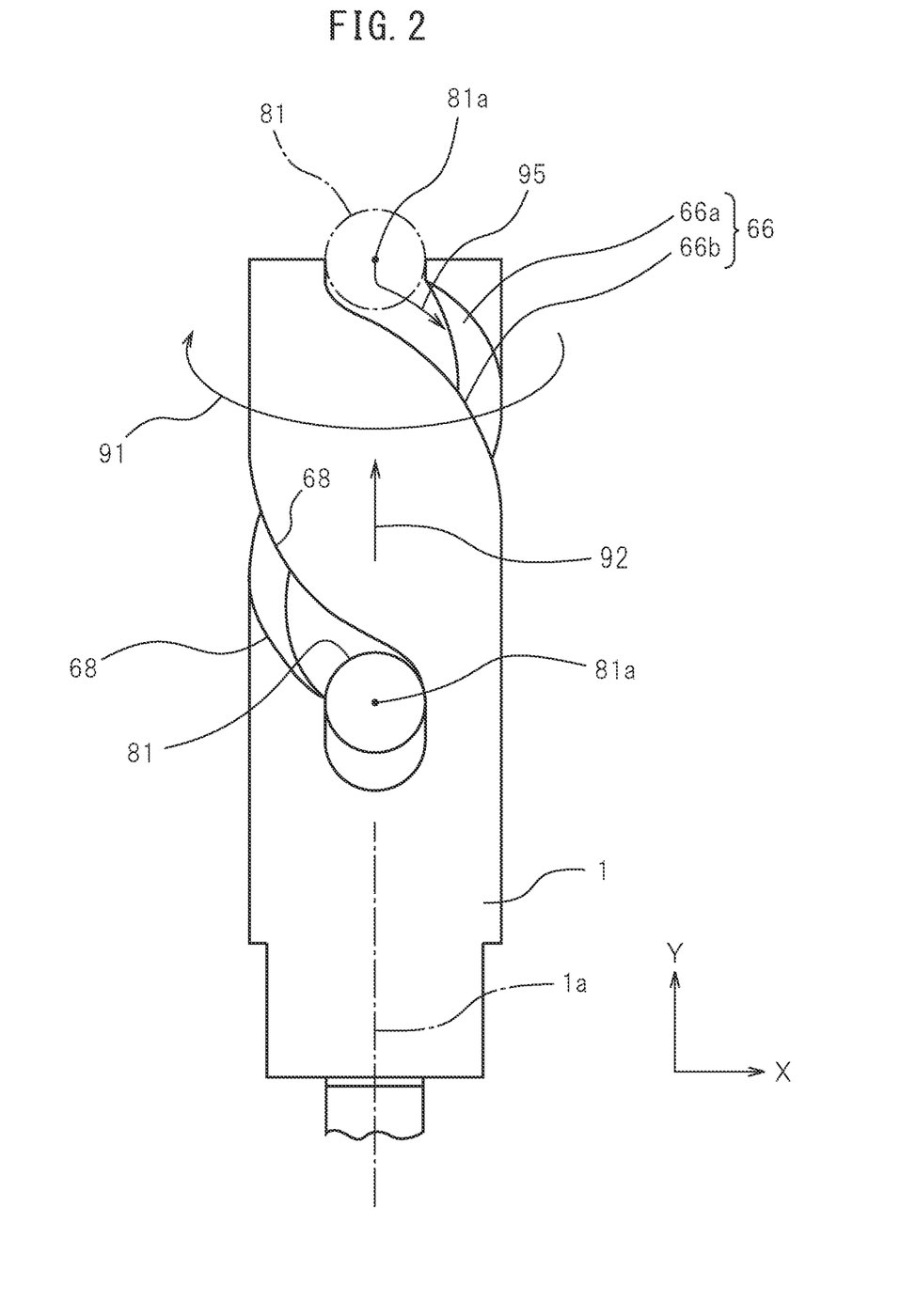
FIG. 2 is a front view of a workpiece having a cam groove to which the tool path generating method is applied and shows the grooving tool which formed the groove.

FIG. 2 is a schematic plan view of the workpiece 1 in the present embodiment. The workpiece 1 in FIG. 2 is a workpiece for a cylindrical cam and has a cam groove 66 already formed. The cam groove, as is well known, has a rotatably supported cylindrical cam follower 80 (not shown in FIG. 2) inserted into it. The cam groove 66 has a rectangular transverse cross-sectional shape having side surfaces 66a and 66b and a bottom surface and extends in a helix shape that winds around the outer circumferential surface of the workpiece 1 with a fixed width and depth. However, the pitch angle of the helix is not constant. FIG. 2 shows a rotary tool having an outside diameter equal to the width of the cam groove 66 used for forming the cam groove 66, that is, the grooving tool 81, and a corner part 68 formed by the outer circumferential surface of the workpiece 1 and the side surfaces 66a and 66b of the cam groove.

The cam groove 66 is formed by moving the grooving tool 81 relative to the workpiece 1 so that the grooving tool follows a locus of a center axis at the tip portion of the cam follower obtained based on a cam diagram (hereinafter referred to as "locus of cam follower center"). In the present embodiment, while the spindle 20 is moved in the Y-axis direction, the workpiece 1 is rotated in the B-axis direction. The workpiece 1 is moved relative to the grooving tool 81 as shown by the arrow 92 in the Y-axis direction while rotating the workpiece 1 about the center axis 1a as shown by the arrow 91 whereby the cam groove 66 is formed.

Figure 3:
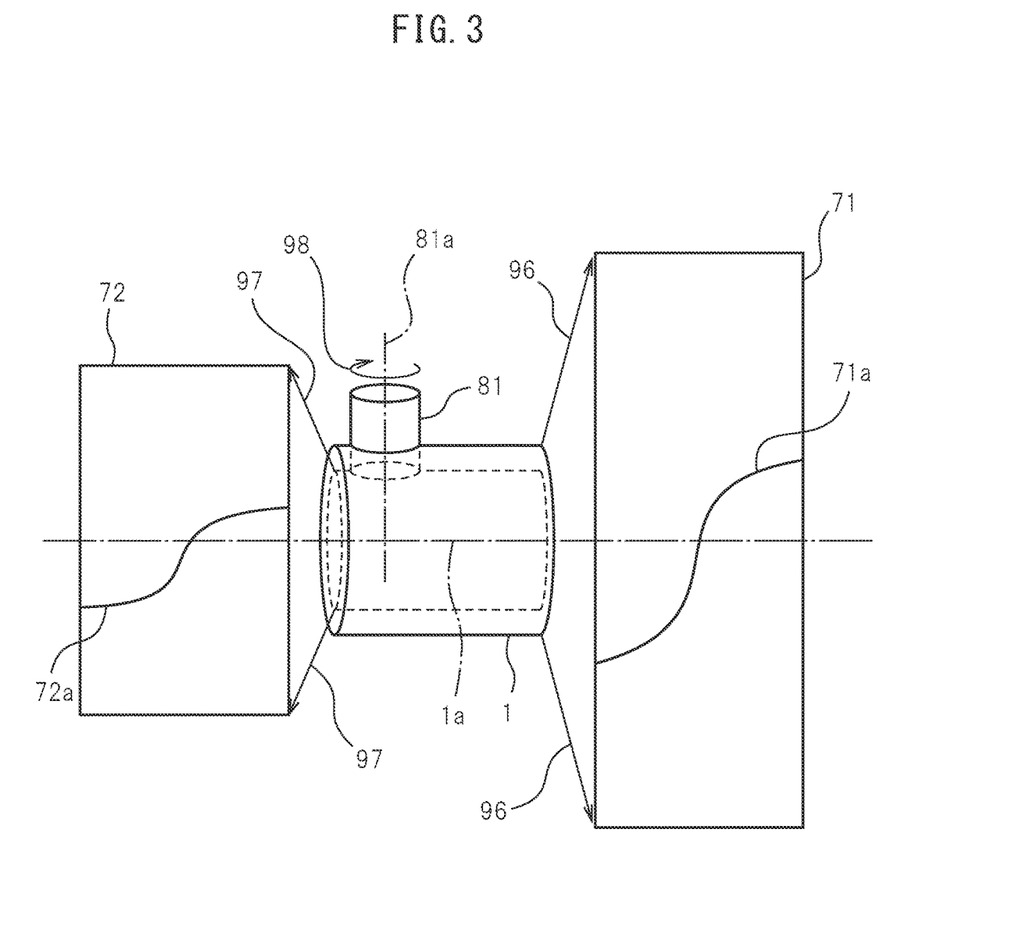
FIG. 3 is a view for explaining a path of a center axis of a grooving tool when forming a cam groove in a workpiece.

FIG. 3 is a schematic view for explaining a locus of a center axis 81a of the grooving tool 81. In the example shown in FIG. 3, the grooving tool 81 is arranged so that the center axis 81a of the grooving tool 81 becomes parallel to the radial direction of the workpiece 1. That is, the center axis 1a of the workpiece 1 is arranged on the extension of the center axis 81a.

The grooving tool 81 rotates about the center axis 81a as indicated by the arrow 98. One end of the grooving tool 81 is inserted into the workpiece 1. A developed view 71 in FIG. 3 is a view in which an outer circumferential surface of the workpiece 1 is laid out as indicated by an arrow 96. A locus 71a through which the center axis 81a passes is shown on the circumferential surface of the workpiece 1. Further, the grooving tool 81 has a point on the center axis 81a at its tip, that is, a tool tip point. A developed view 72 in FIG. 3 is a view in which an inner circumferential surface of the workpiece 1 passing through the tool tip point is laid out as indicated by an arrow 97. In the developed view 72, a locus 72a of the tool tip point is shown.

When comparing the locus 71a of the point on the tool center axis 81a on the surface of the workpiece 1 with the locus 72a of the tool tip point, it will be understood that the shapes of the loci differ from each other. The turning radii when the workpiece 1 rotates with respect to the grooving tool 81 are different from each other, so the loci of the points differ. Therefore, a relative traveling direction of the grooving tool 81 with respect to the workpiece 1 differs in the depth direction of the groove 66.

The locus of the center axis 81a of the grooving tool 81 corresponds to a locus of the cam follower center. More precisely, the locus of the cam follower center in this Description corresponds to the locus of the center at the tip end of the cam follower, so it can be said that the locus 72a of the tool tip point on the center axis 81a of the grooving tool 81 corresponds to the locus of the cam follower center.

Figure 4:
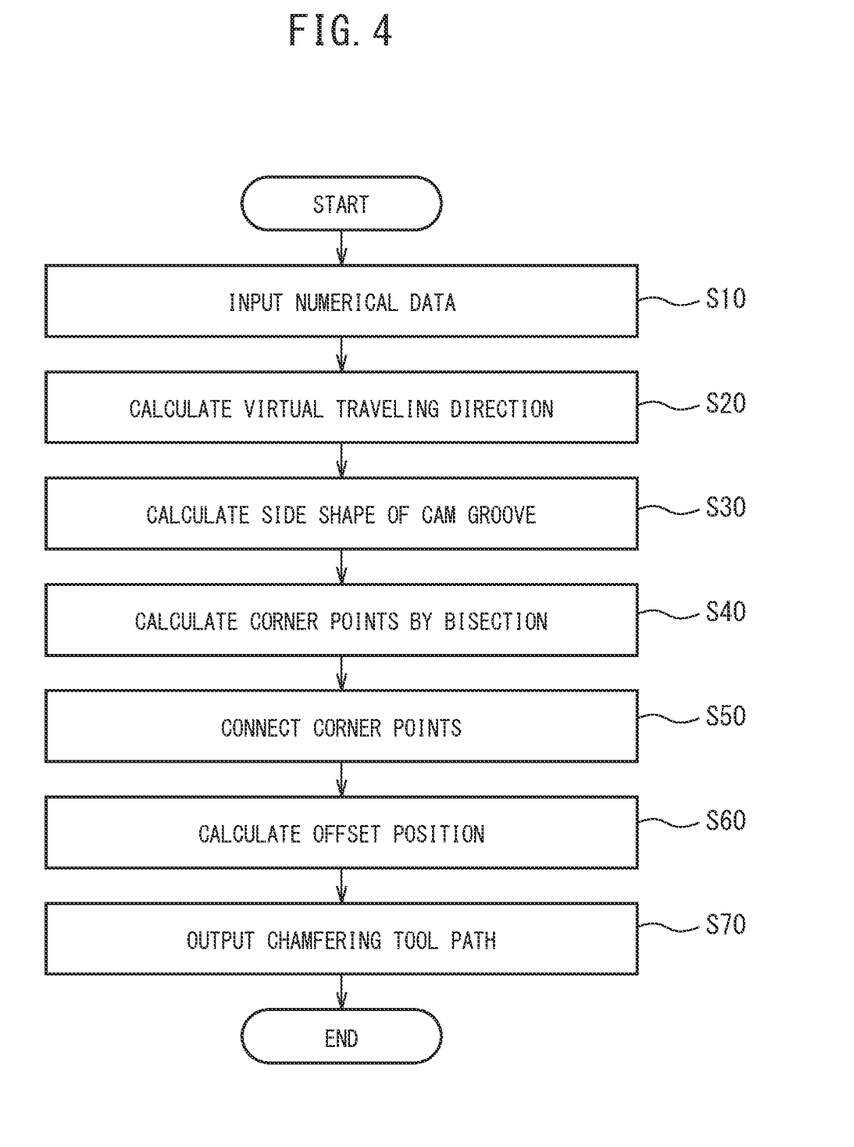
FIG. 4 is a flowchart showing a tool path generating method in a stepwise manner.

A chamfered part is formed at the cam groove 66 formed in the columnar workpiece 1 in accordance with the method stepwise shown in the flowchart of FIG. 4. This method is carried out, for example, using a tool path generating apparatus shown in FIG. 11. As a tool, a rotary tool having a conical blade part having an outside diameter considerably smaller than the width of the cam groove 66, that is, a chamfering tool 83, is used.

First, at step S10, numerical data mainly comprised of shape data utilized for forming the can groove 66 such as the locus of the cam follower center, the width W of the cam groove 66, an offset amount S of the chamfering tool, the outer shape of the workpiece 1, and the axial configuration of the machine tool 10 is input to the chamfering tool path generating apparatus or the like.

Figure 5:
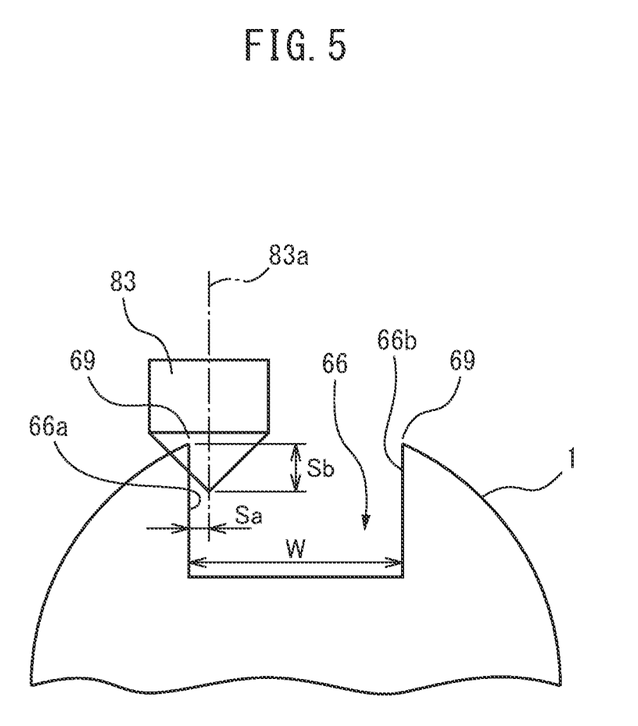
FIG. 5 is a schematic horizontal cross-sectional view of a workpiece showing a relationship between a cam groove formed in a workpiece and a chamfering tool.

The chamfering tool offset amount S is comprised of the lateral direction offset amount Sa and depth direction, that is, height direction, offset amount Sb of FIG. 5. The lateral direction offset amount Sa represents the distance between the side surface of the cam groove 66 and a center axis 83a of the chamfering tool 83 located at the center side of the cam groove 66. The height direction offset amount Sb represents the distance in the vertical direction in FIG. 5 from an intersection 69 between the outer circumferential surface of the workpiece 1 and the side surface of the cam groove (hereinafter referred to as "corner point") to the tip of the chamfering tool 83. The chamfering tool offset amount S is set according to the size of a desired chamfered part.

Since the workpiece 1 in the present embodiment is a workpiece 1 for a cylindrical cam, its outer shape is a cylindrical shape, so the radius and length of the cylinder are input as the outer shape of the workpiece 1. Further, if necessary, dimensions of a chamfered part (not shown) formed on the end portion of the workpiece 1 and the like are also input.

The axial configuration of the machine tool 10 is input as four axis control in the present embodiment.

In this regard, forming the cam groove 66 requires the path of the cam follower center, the width W of the cam groove 66, the outer shape of the workpiece 1, and the axial configuration of the machine tool 10 as data. Usually these data have already been input to a CAD device 51 or the like at the time of chamfering. Therefore, it is usually sufficient to configure the system so that those already input data are supplied from the CAD device 51 to the tool path generating apparatus 75.

Figure 6:
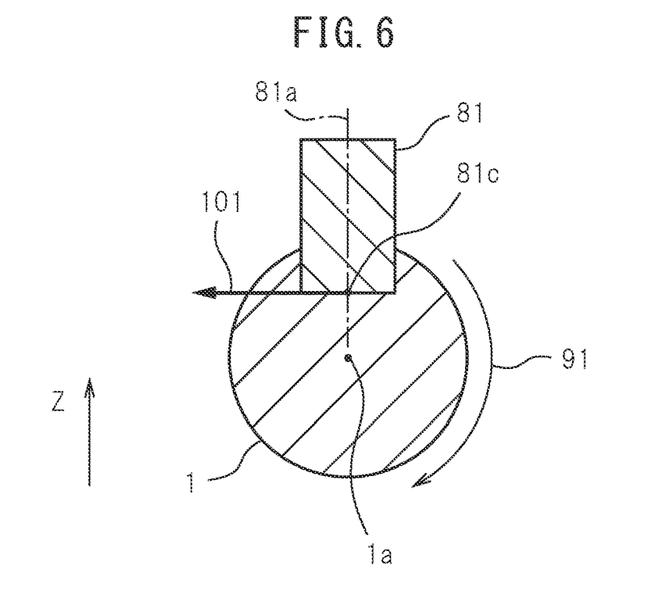
FIG. 6 is a schematic cross-sectional view of a workpiece and grooving tool for explaining a virtual traveling direction of a grooving tool.

At the next step S20, the virtual traveling direction is calculated. Here, the "virtual traveling direction" will be described with reference to FIG. 6 to FIG. 8. FIG. 6 is a schematic cross-sectional view of the workpiece 1 and the grooving tool 81 for explaining the virtual traveling direction. The virtual traveling direction is the traveling direction of the center axis of the grooving tool 81 with respect to the workpiece 1 when it is assumed that the workpiece 1 is stopped. As the virtual traveling direction, it is possible to adopt the traveling direction of a plurality of points at different heights of the grooving tool 81. In the example shown in FIG. 6, the workpiece 1 is rotated in the direction indicated by the arrow 91 without changing the position of the grooving tool 81. At this time, assuming that the workpiece 1 is stopped, the virtual traveling direction of the tool tip point 81c relatively becomes the direction indicated by the arrow 101. The virtual traveling direction can be set, for example, by a vector having a unit length in the X-, Y-, and Z-axes.

Figure 7:
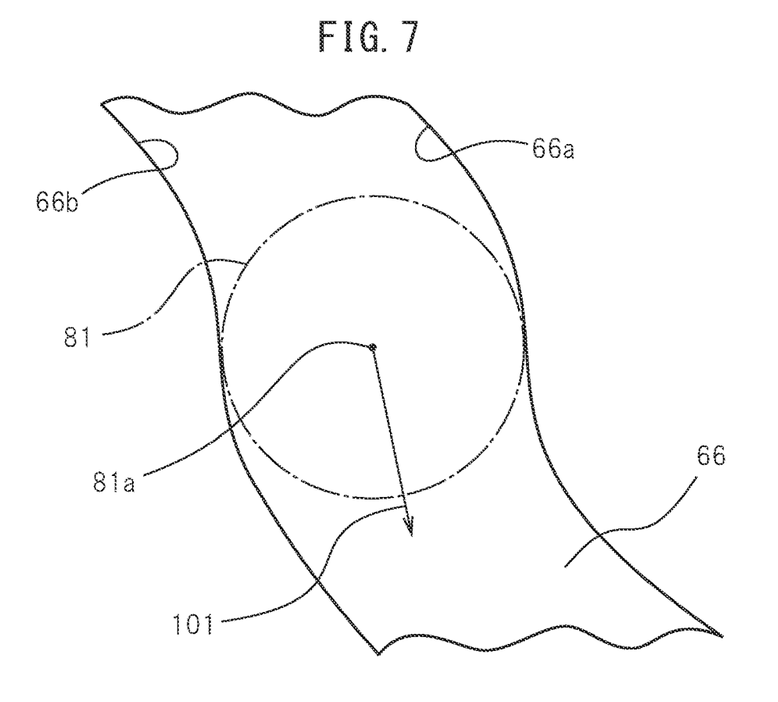
FIG. 7 is a schematic view showing a cam groove of a workpiece and a grooving tool for explaining a virtual traveling direction of a grooving tool.

FIG. 7 is a schematic plan view showing the cam groove 66 of the workpiece 1 and the grooving tool 81 for forming the same. In the example shown in FIG. 7, the grooving tool 81 is moved without rotating the workpiece 1. The virtual traveling direction at a point of a predetermined height of the grooving tool 81 is indicated by an arrow 101. As described above, the "virtual traveling direction" indicates the direction in which the grooving tool 81 having the same diameter as the width of the cam groove 66 advances along the direction of extension of the cam groove 66. The virtual traveling direction of such a grooving tool 81 is equal to the virtual traveling direction of the cam follower 80 with respect to the cam assuming that the cam is stopped. The virtual traveling direction of the grooving tool 81 or the virtual traveling direction of the cam follower 80 can be found from the locus of the cam follower center.

Figure 8:
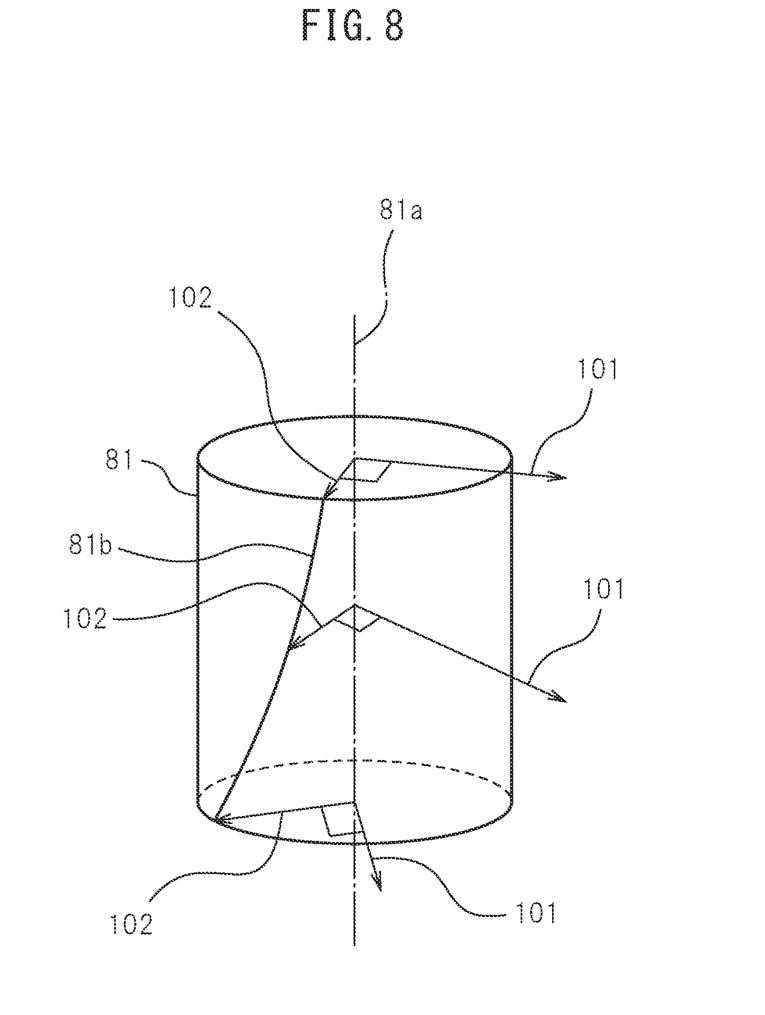
FIG. 8 is a schematic perspective view of a grooving tool for explaining a virtual traveling direction of a grooving tool.

FIG. 8 is a schematic perspective view for explaining the virtual traveling direction of the grooving tool 81 when moving the tool with respect to the rotating workpiece 1 (not shown). In FIG. 8, three arrows 101 indicate the virtual traveling direction at three points in the height direction of the grooving tool 81. The virtual traveling direction in FIG. 8 is a direction obtained by combining the virtual traveling direction due to the rotation of the workpiece 1 shown in FIG. 6 and the virtual traveling direction due to the grooving tool 81 shown in FIG. 7. As can be seen from FIG. 8, the virtual traveling direction changes in the height direction of the grooving tool 81, that is, in the radial direction of the cylindrical workpiece 1. This is because the circumferential speed of the rotating workpiece 1 decreases from the maximum value on the outer circumferential surface toward the rotational center of the workpiece 1.

An arrow 102 in FIG. 8 indicates a direction vertical to the virtual traveling direction. A curve obtained by a series of intersections of the arrow 102 and the outer circumferential surface of the grooving tool 81 defines a contact line 81$b$. The "outer circumferential surface" of the grooving tool 81 referred to here is a cylindrical surface having the same diameter as the data of the tool diameter stored in the control device and is a virtual cylindrical surface drawn by the rotation of the cutting edge of the tool. In the control device of the machine tool, the tool diameter and a tool length are stored as tool data. This data is used here. This contact line 81$b$ of the grooving tool 81 is a part forming the side surfaces 66$a$ and 66$b$ (not shown) of the cam groove. Further, it can be said that the contact line 81$b$ corresponds to the part where the machined surface of the final workpiece 1 is formed when machining the workpiece 1. In a machining process in which only the grooving tool 81 is linearly moved without accompanying rotation of the workpiece 1, the contact line 81$b$ and the center axis 81$a$ of the grooving tool 81 become parallel to each other, but as in the present embodiment, the contact line 81$b$ is not parallel to the center axis 81$a$ of the grooving tool 81 in a machining process in which the rotation of the workpiece 1 and the movement of the grooving tool 81 are performed at the same time. As in the example shown in FIG. 8, when the workpiece rotates and the tool linearly moves, the contact line 81$b$ is a curve, but if the workpiece does not rotate and the tool only moves linearly, the contact line 81$b$ becomes a straight line.

In the present embodiment, the grooving tool 81 has an outside diameter equal to the width of the cam groove 66, so the virtual traveling direction of such a tool coincides with the virtual traveling direction of the cam follower 80. Therefore, in the following description, the term "virtual traveling direction of the cam follower" or simply "virtual traveling direction" is used instead of the "virtual traveling direction of the grooving tool 81".

At step S30, the side shape of the cam groove 66 is calculated from the virtual traveling direction calculated at step S20. The "side shape of the cam groove 66" is a three-dimensional curved surface defined as the function Cp(t,z). The function Cp(t,z) shows the point at which the distance in the Z-axis direction from the lowest part of the cam follower becomes "z" in the locations where the cam follower 80 contacts the side surface of the cam groove 66 at the time of "t" second from the start when the cam follower 80 travels on the locus of the center by exactly one block per second from the starting point of the locus of the cam follower center.

Figure 9:
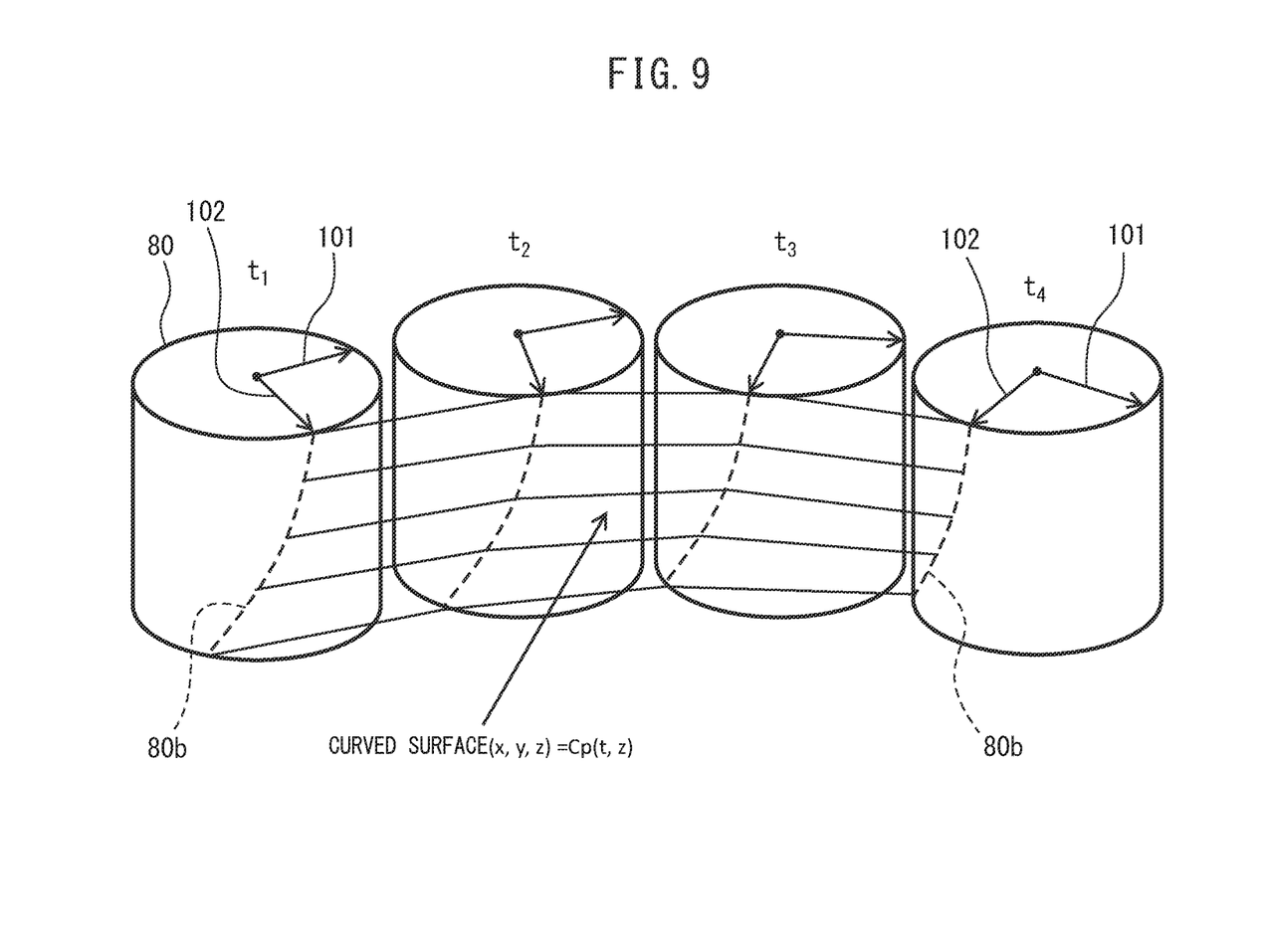
FIG. 9 is a schematic diagram showing a relationship between a virtual traveling direction of a cam follower and a side shape of a cam groove.

FIG. 9 shows schematically the positions to which the cam follower has moved along the locus of the cam follower center at the times $t_1$, $t_2$, $t_3$, and $t_4$. From this figure, it is shown that the side shape of the cam groove 66 is formed by the contact line 80$b$ connecting an intersection between the arrow 102 representing the vector in the direction perpendicular to the direction of the arrow 101 indicating the virtual traveling direction and the outer circumferential surface of the cam follower also shown in FIG. 8. Due to this, it will be understood that the side shape of the cam groove 66 can be obtained based on the virtual traveling direction.

However, even if the side shape of the cam groove 66 is found, the position of the corner point 69 included therein, that is, the position where the side surface shape of the cam groove 66 intersects the outer circumferential surface of the columnar workpiece 1, is not specified at the stage up to step S30. Therefore, at step S40, the position of the corner point 69 included in the side shape of the cam groove 66 is determined using the bisection method.

Figure 10:
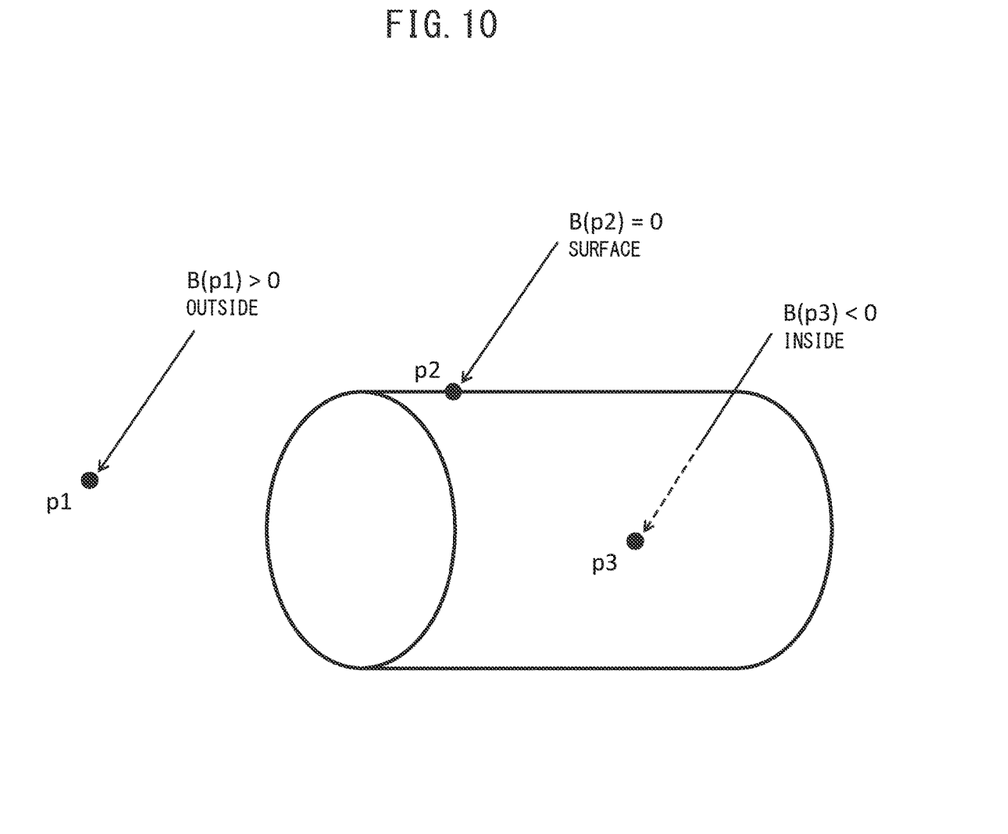
FIG. 10 is a perspective view of a workpiece for explaining the principle of bisection.

First, the cylindrical shape of the workpiece 1 is defined as a function B as follows. That is, as shown in FIG. 10, B(p) is a negative number when the point "p" is inside the cylinder, B(p) is 0 when the point "p" is in contact with the surface of the cylinder, and B(p) is a positive number when the point "p" is outside the cylinder.

When the curved surface of the side shape of the cam groove found at the previous step S30 are divided into in the "t" direction and the "z" direction and the numbers of sections are designated as NT and NZ and the maximum values in the "t" direction and the "z" direction are designated as MT and MZ respectively, the following processings are repeated in the range of $0 \le i \le NT$ and $0 \le j \le NZ$:

the processing of finding the point where the function B becomes 0 by the bisection method and adding it as the corner point 69 when B(Cp(i/NT*MT, j/NZ*MZ)) and B(Cp (i/NT*MT, (j+1)/NZ*MZ)) differ in sign and;

the processing of finding the point where the function B becomes 0 by the bisection method and adding it as the corner point 69 when B(Cp(i/NT*MT, j/NZ*MZ)) and B(Cp (i+1)/NT*MT, j/NZ*MZ)) differ in sign.

The above-described processing of step S40 results in the positions of a large number of corner points 69 being specified, so at step S50, the large number of corner points 69 are connected to generate the corner part 68. This processing can be performed using, for example, the two-dimensional marching cube algorithm.

At step S60, the tool path of the chamfering tool 83 is found. For this reason, the position of the center axis 83$a$ and the position of the tip point of the chamfering tool 83 are offset from the position of the corner part 68 obtained at the previous step. More specifically, (1) on the XY plane of the machine coordinates, the center axis 83$a$ of the chamfering tool 83 is moved in the direction of the locus of the cam follower center, in other words, in the direction vertical to the virtual traveling direction, by exactly the distance input for the lateral direction offset amount Sa of the chamfering tool 83 and (2) the tip point of the chamfering tool is moved in the Z-minus direction of the machine coordinates by exactly the distance input for the height direction offset amount Sb of the chamfering tool 83.

At step S70, the chamfering tool path calculated at step S60 is output as NC data to the control device 55 of the machine tool 10. This being so, in this embodiment, the machine tool 10 controls the Y-axis servo motor 31, the Z-axis servo motor 25, and the B-axis servo motor 43 by the control device 55 so as to form at the corner part 68 of the cam groove 66 a uniform chamfered part based on the chamfering tool offset amount S input at S10.

According to the tool path generating method of the present embodiment, by inputting simple numerical data at step S10, it is possible to output a chamfering tool path enabling uniform chamfering of even a complex cam groove 66 of a three-dimensional cam such as a cylindrical cam.

Next, a tool path generating apparatus 75 according to an embodiment of the present invention for machining the tool path generating method of the above-described embodiment will be described with reference to FIG. 11.

Figure 11:
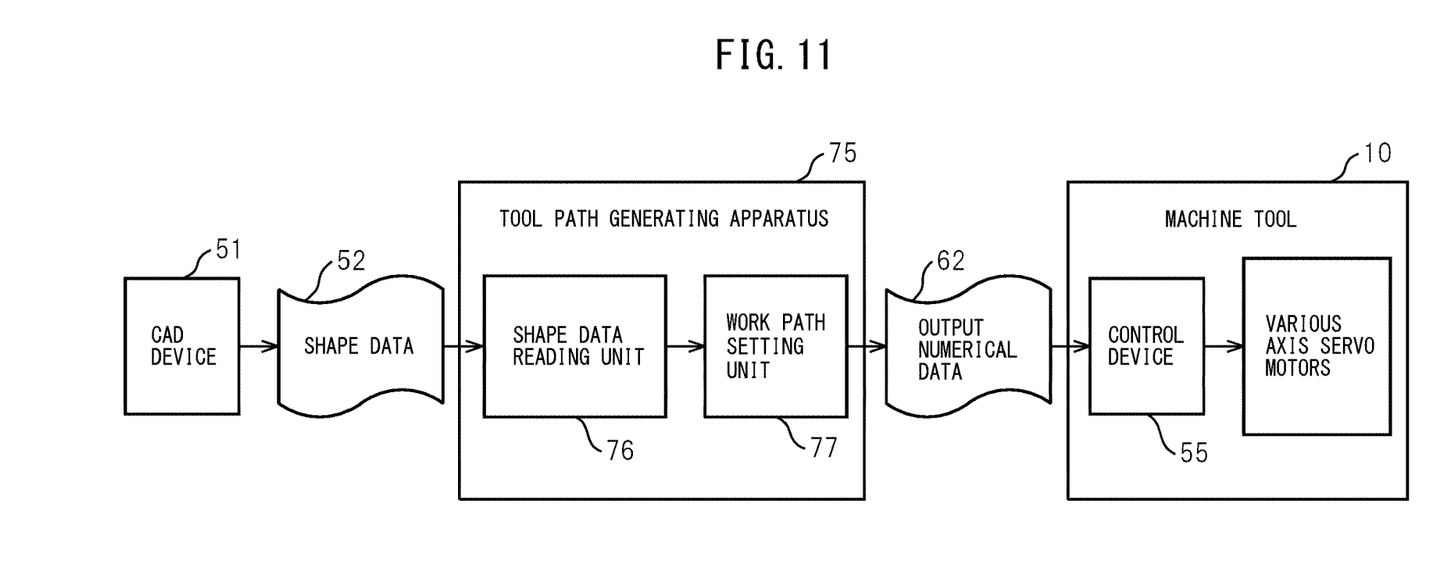
FIG. 11 is a view showing a configuration of a tool path generating apparatus and devices related thereto according to an embodiment of the present invention.

The tool path generating apparatus 75 shown in FIG. 11 is disposed between the CAD device 51 and the control device 55 of the machine tool 10 and comprises a shape data reading unit 76 and a work path setting unit 77 configured by a not shown microprocessor (CPU) for performing processing and the like, storage device comprised of a ROM (read only memory) or RAM (random access memory), and other peripheral circuits. The shape data reading unit 76 can read numerical data mainly consisting of the shape data which is input such as the locus of the cam follower center. The work path setting unit 77, based on the read numerical data, for example calculates the chamfering tool path by a method as shown from the above step S20 to step S60, uses this as the output numerical data 62, and outputs it to the control device 55 of the machine tool 10.

The numerical data 52 such as the shape data input to the shape data reading unit 76 is not all limited to data output from the CAD device 51 and may include at least partially data directly input to the tool path generating apparatus 75. For this reason, the tool path generating apparatus 75 may comprise a data input unit including a keyboard and monitor etc. enabling direct input of numerical data 52.

In the above embodiment, the chamfered part is formed at the open edge of the cam groove 66, but in the present invention, the groove at which the chamfered part is formed is not limited to a cam groove. According to the present invention, an embodiment of a tool path generating method or a tool path generating apparatus for forming a chamfered part at any groove shaped or other recessed part formed in a workpiece by making one rotary feed axis and one linear feed axis of a machine tool simultaneously move or by making two rotary feed axes simultaneously operate while making the rotary tool and workpiece move relatively to each other is also possible.

In the above embodiments, the cam groove formed with a chamfered part is machined in a workpiece for a cylindrical cam, but an embodiment in which the cam groove formed with the chamfered part is a cam groove of a roller gear cam or conical cam or other 3D cam is also possible.

REFERENCE SIGNS LIST 1. workpiece
10. machine tool
20. spindle
55. control device
66. cam groove
75. tool path generating apparatus
76. shape data reading unit
77. work path setting unit
80. cam follower
81. grooving tool
83. chamfering tool

The invention claimed is:

1. A tool path generating method for generating a tool path for machining a corner part where a recessed part formed in a workpiece and an outer circumferential surface of the workpiece intersect by making a rotary tool and the workpiece rotate and at the same time by moving the rotary tool and the workpiece linearly relatively to each other, the tool path generating method comprising steps of:
   calculating, as a virtual traveling direction, a direction of movement of a plurality of points on a rotational axis of the rotary tool when machining the recessed part;
   calculating a contact line, which is a curve defined by a series of intersections of lines extending from the plurality of points on the rotational axis of the rotary tool in a direction perpendicular to the virtual traveling direction and an outer circumferential surface of the rotary tool,
   calculating a position of the corner part from the contact line and shape data of the outer circumference surface of the workpiece; and
   generating a tool path of another tool for machining the workpiece along the calculated positions of the corner part.

2. The tool path generating method according to claim 1, wherein, in the step of generating a tool path for machining the workpiece along the position of the corner part, a path offset from the corner part is found from the calculated virtual traveling direction and the position of the corner part and the offset path is made the tool path machining the corner part.

3. The tool path generating method according to claim 1, wherein the tool path for machining the workpiece along the position of the corner part is a path of a tool for straight or curved chamfering of the corner part.

4. The tool path generating method according to claim 1, wherein the workpiece is any of a cylindrical cam, a conical cam, and a roller gear cam, the recessed part is a cam groove, and the tool path of the rotary tool is a locus of a center axis of a cam follower engaging with the cam groove.

5. A tool path generating apparatus for generating a tool path for machining a corner part where a recessed part formed in a workpiece and an outer circumferential surface of the workpiece intersect by making a rotary tool and the workpiece rotate and at the same time by moving the rotary tool and the workpiece linearly relatively to each other, comprising:
   a shape data reading unit for reading a tool path of the rotary tool when machining the recessed part and shape data of the workpiece; and
   a path setting unit for calculating, as a virtual traveling direction, a direction of movement of a plurality of points on a rotational axis of the rotary tool when machining the recessed part, calculating a contact line, which is a curve defined by a series of intersections of lines extending from the plurality of points on the rotational axis of the rotary tool in a direction perpendicular to the virtual traveling direction and an outer circumferential surface of the rotary tool, and calculating a position of the corner part from the contact line and shape data of the outer circumference surface of the workpiece and generating a tool path of another tool for machining the workpiece along the positions of the corner part found.

* * * * *